United States Patent [19]
Charamel

[11] 3,763,336
[45] Oct. 2, 1973

[54] POLYPHASE CURRENT COLLECTING DEVICE FOR A VEHICLE MOVING ALONG A TRACKWAY

[75] Inventor: Pierre Charamel, Les Cotes de Sassenage, France

[73] Assignee: Merlin Gerin, Societe Anonyme, Grenoble, France

[22] Filed: Jan. 12, 1972

[21] Appl. No.: 217,200

[30] Foreign Application Priority Data
Jan. 22, 1971   France .............................. 7102909

[52] U.S. Cl. .............................................. 191/49
[51] Int. Cl. ............................................. B60l 5/38
[58] Field of Search ................... 191/22, 23, 24, 25, 191/28, 29, 30, 31, 33, 34, 35, 45, 47, 48, 49, 50, 53, 59, 59.1

[56] References Cited
UNITED STATES PATENTS
| 1,693,914 | 12/1928 | Avera | 191/53 |
| 410,498 | 9/1889 | Daft | 191/34 |
| 3,169,733 | 2/1965 | Barrett | 191/29 |

Primary Examiner—Gerald M. Forlenza
Assistant Examiner—D. W. Keen
Attorney—Richard K. Stevens

[57] ABSTRACT

A current collecting device for a vehicle movable along a trackway. A plurality of semi-hollow longitudinally cut away cylindrical phase conductors extend along the trackway. Each phase conductor accommodates a current collecting head which is mechanically connected to the vehicle by rods extending through the passageways defined by the lips of the cut away conductors.

3 Claims, 3 Drawing Figures

POLYPHASE CURRENT COLLECTING DEVICE FOR A VEHICLE MOVING ALONG A TRACKWAY

This invention relates to a polyphase current collecting device for a vehicle moving along a trackway such as a high speed, linear induction motor driven, air cushion vehicle.

Certain known devices of the kind mentioned have a plurality of parallel phase condutors defining therebetween a polygonal passageway to accomodate a collector head. The collector head has a row of contact shoes for each phase conductor and all the contact shoes of the different rows are supported from a central body member. Springs disposed between the body member and the contact shoes urge the latter resiliently against the phase conductors to collect from the conductors currents to be supplied to the vehicle and also to guide the collector head in the passageway. A suitable mechanical connection of the collector head to the vehicle is provided and these known devices are capable to operate satisfactorily at relatively high speeds which may reach several hundreds of miles per hour.

The constant increase of the involved power ratings compel manufacturers to consider the utilization of increasing voltage ratings for the phase conductors and the known devices have shown to present difficulties with regard to insulating imperatives.

It is a major object of the invention to provide a simple and low-cost current collecting arrangement permitting the use of relatively high voltages, such as 5 kilovolts and more, without affecting the dynamic and electrical behavior of the device.

It is another object of the invention to provide a current collecting system having improved electric field characteristics around the phase conductors.

A further object of the invention is to provide a simple and reliable mechanical connection structure between the current collecting means and the vehicle.

Another object of the invention is to provide a current collecting arrangement having an improved support structure which permits thermal expansion movements of the conductors.

A still further object of the invention is to provide a current collecting device having phase conductors of a shape avoiding dirt accumulation therein which might detrimentally affect the electrical contact between the conductors and the contact shoes.

These and other advantages and characteristics of the invention will become apparent from the following description of some embodiments of the invention, given by way of illustration and not of limitation, which are shown in the accompanying drawings, in which.

Figure 1:
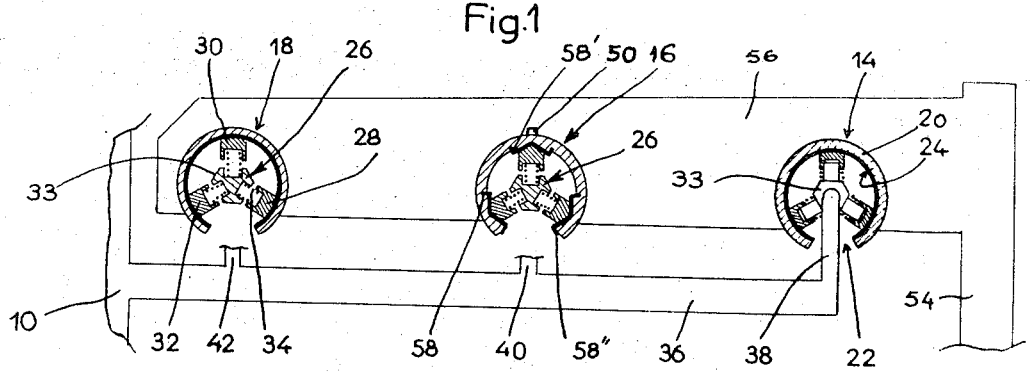
FIG. 1 is a schematic view, partially in cross-section, of a part of a current collecting device in accordance with the invention, showing two embodiments of the conductor rails.

In the figures, in which the same reference numbers refer to like elements, a vehicle 10 is shown capable of moving along a track 12 on which it is guided and supported for instance by fluid cushions in a known manner. The vehicle 10 may have a linear induction motor carried by it which is capable of supplying the force for the propulsion of the vehicle. The on-board electrical equipment of the vehicle is fed with current by a current collecting device having three feed con-ductors in the form of rails 14, 16, 18 which extend parallel to the track 12. Each conductor 14, 16, 18 corresponds to one of the phases of the polyphase supply current of the vehicle. The distance between the conductors 14, 16, 18 is adapted to the rated feed voltage, which may be higher than 5 kilovolts.

FIG. 1 shows two types of conductors 14, 18 and 16 respectively, but it is obvious that it is advantageous to use only one type for all the phase conductors of a given current collecting system. The conductor 14 of the first type, shown at 18 in cross-section, consists of a cylindrical tube 20 of circular cross-section cut away at its base at 22 and lined on the inside with a shell 24 of stainless steel. The shell 24 covers practically the entire inner surface of the conductor 20 which may advantageously consist of aluminum. Within the tubular conductor 14 there is a movable current collecting head 26 which bears three contact shoes or brushes 28, 30, 32 which extend radially from the central support member 33 and are urged by springs 34 into contact with the inner face of the shell 24. The contact shoes 28, 30, 32 guide and position the collector head 26 coaxially in the tube 14 during its displacement without requiring any other guide system. The contact shoes 28, 30, 32 are slidably mounted in cages or on guide rods (not shown) in a known manner so as to slide radially in order to maintain permanent contact with the inner contact surface of the conductor whatever the relative position of the collector head with respect to the latter.

Figure 3:
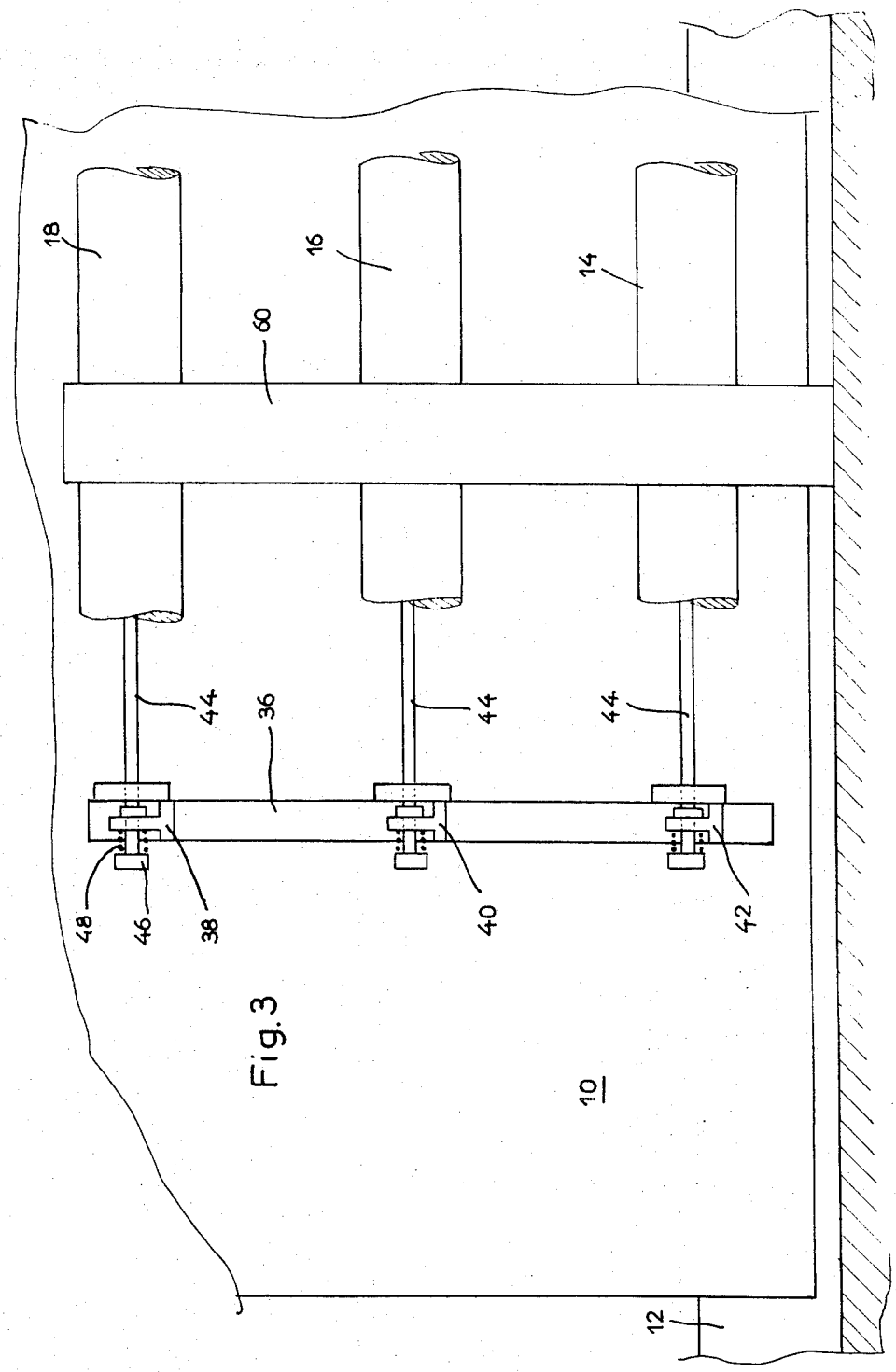
FIG. 3 is a side view of the device of FIG. 2, the conductor rails being partially broken away.

The current collecting heads 26 cooperating with the different phase conductors 14, 16, 18 are carried along by the vehicle 10 by means of mechanical connections comprising a comb-shaped extension 36 the branch teeth or rods 38, 40, 42 of which penetrate into the associated conductors 14, 16, 18 passing through the cut away slits 22. An articulated connecting system connects the end of the teeth 38, 40, 42 to the corresponding central body members 33 of the collector heads 26 so as to transmit a traction force which acts in the direction of displacement of the collector heads with the exclusion of any other force component. A system of the type indicated is shown schematically in FIG. 3 in which a connecting rod 44 extending substantially axially of the conductors 14, 16, 18 passes through an opening provided at the end of the teeth 38, 40, 42, respectively, and terminates in a stop 46. The orifice provided in the teeth 38, 40, 42 is substantially aligned with the axis of the conductors 14, 16, 18 and its diameter permits the rod 44 to pivot with limited amplitude. The opposite end of the rod 44 is pivotally mounted in a not shown manner on the central body of the associated collector head 26. A spring 48 is advantageously provided between the stop 46 of the rods 44 and the tooth 38, 40, 42 so as to dampen the forces transmitted to the draw rods 44. Electric conductors (not shown) are advantageously embedded in the comb 36 and in the traction teeth 38, 40, 42 so as to transmit the collected current, for instance through the rod 44 and flexible conductors (not shown), to the vehicle 10 carrying the electric motor which is fed by the collected polyphase current.

The conductors 14, 16, 18 connected to each of the phases of a polyphase source of current are supported by masts 54 staggered along the track of the vehicle 10, and which comprise a horizontal arm 56 of insulating material provided on their lower face with arcuate recesses having a restricted opening in which the tubes 14, 16, 18 are accomodated. The slit 22 of the conductors faces downward and thus prevents any penetration or accumulation of dirt within the conductor rail.

The operation of the device of FIG. 1 is obvious and it will be sufficient to point out that the variations in amplitude or position of the vehicle 10 with respect to the current collecting path consisting of the conductors 14, 16, 18 are compehsated for by the mechanical connecting system which transmits the force of traction to the different collector heads 26. The conductors 14, 16, 18 are individually insulated one with respect to the others and it is easy to understand that the collector heads 26 and the associated contact shoes 28, 30, 32 may thus be of very small size. The cylindrical outer shape of the conductor bars 14, 16, 18 favors a distribution of the electric field which permits the different conductors to be brought optimally close to each other. The cylindrical inner profile permits rotation of the collector head by a limited amplitude around its longitudinal axis, making it possible to provide the contact surfaces on the entire inner wall of the conductor. The amplitude of this oscillation must obviously be limited by some suitable means so as to avoid the escape of a contact shoe coming in front of the slit 22. This limitation can be obtained by inner protrusions (not shown) provided on the edges or lips of the slit 22. Such a limitation could also be included in the system of transmitting the tractive force by any stops (not shown).

In FIG. 1 there is shown a conductor 16 with modified inner contact surface. Opposite each contact shoe 28, 30, 32 there are fastened on the inner surface of the conductor 16 profiled strips 58, 58', 58'' having the shape of the letter W presenting to the contact shoes a dihedral surface capable of cooperating with the mating contact surfaces of convex V shape of said contact shoes. These dihedral surfaces make it possible to have a centering force which limits the rolling oscillations of the collector head arond its longitudinal axis thereby avoiding any stop mechanism for the limiting of this movement. Profiled strips 58, 58', 58'' of stainless steel are fastened in any known manner to the aluminum conductors 16. The outer contour of the conductor comprises a longitudinally extending positioning rib 50 capable of sliding in longitudinal direction of the conductor in a mating groove provided in the support arm 56.

Figure 2:
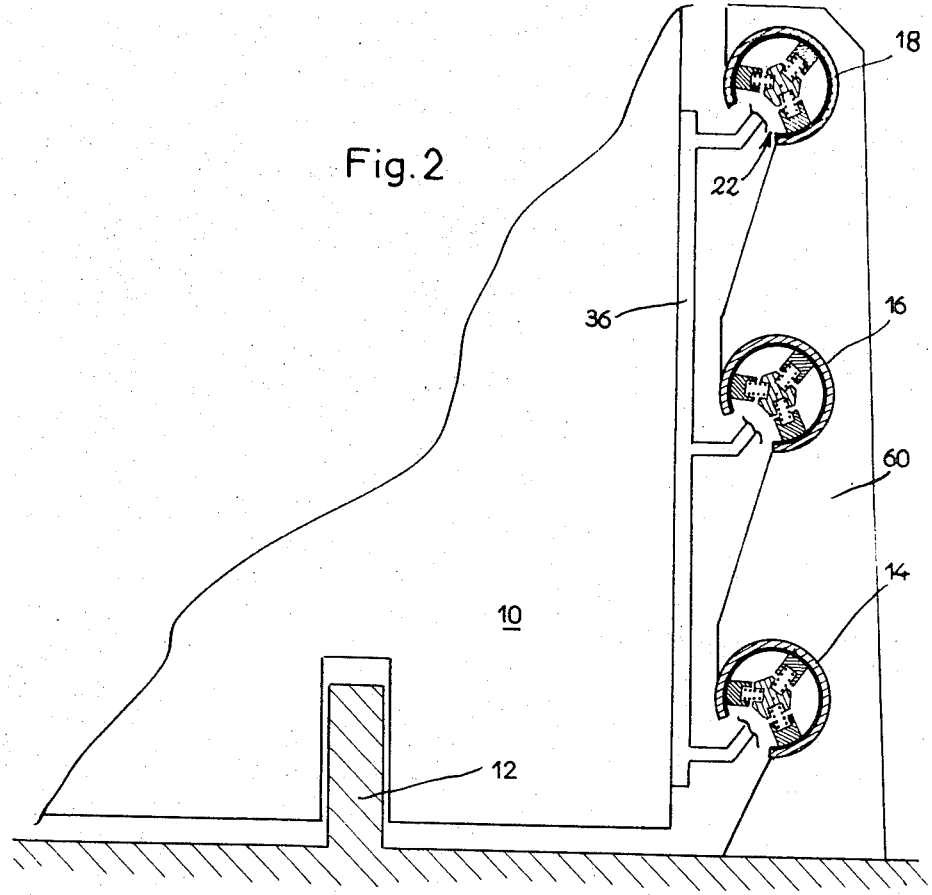
FIG. 2 is a view similar to FIG. 1, illustrating another embodiment of the invention.

FIG. 2 illustrates a variant embodiment of the invention in which the conductor rails are aligned in a vertical plane. The same reference numbers have been used to designate parts identical to those shown in FIG. 1. The tubular conductors 14, 16, 18 constituting the current distribution path are supported by vertical posts 60 staggered along the path and have on their face opposite the track of the vehicle 10 recesses which receive the conductors 14, 16, 18. The slits 22 of the conductors are directed obliquely downward and disposed in one of the lower quadrants of the cylindrical shape of the conductors so as to avoid any low point within the tubular shape which might offer a possiblity for the accumulation of dust or dirt. The mechanical connection between the collector heads 26 and the vehicle comprises a traction comb 36 for the different phases arranged opposite the conductors 14, 16, 18 and secured to the side wall of the vehicle 10 in the embodiment of FIG. 3 The operation of the device is, of course, in no way affected by this vertical arrangement of the current distribution rails.

The cylindrical profile of the conductor rails is particularly adapted to the current collecting device in accordance with the invention but it will be clear that other rounded shapes, for instance an elliptical shape, could be employed.

What is claimed is:

1. An arrangement to supply polyphase current to a vehicle movable along a trackway, comprising a plurality of substantially tubular phase conductors extending parallelly to said trackway, each phase conductor having a longitudinally slotted cylindrical shape defining a linear passageway extending along the whole length thereof, a current collector for each conductor and adapted for slidable longitudinal movement therein, said current collector comprising a central support member disposed axially of said conductor and supporting at least three peripheral contact shoes circumferentially spaced apart and guided movement radial moevment towards the inner wall portion of said conductor under the action of resilient bias means, and connection means to connect the current collectors mechanically to said vehicle in driving relation therewith, said connection means comprising a combed portion having a plurality of branch rods, one for each collector, each branch rod traversing the passageway of the corresponding conductor, the free end of each branch rod being connected to the central support member of the corresponding collector through articulated rod means which transmit a resultant traction force to said collector acting substantially in the direction of movement of said collector.

2. An arrangement according to claim 1, said articulated rod means comprising a traction rod extending substantially axially of the corresponding phase conductor.

3. An arrangement according to claim 2, said articulated rod means comprising means providing for small axial and angular movements of said traction rod with respect to said free end of the corresponding branch rod.

* * * * *